Mar. 20, 1923.

A. BRUCKNER

APPARATUS FOR MAKING CEMENT BLOCKS

Filed May 4, 1922

1,448,911

2 sheets-sheet 1

INVENTOR.
Albert Bruckner
BY F. N. Barber
ATTORNEY.

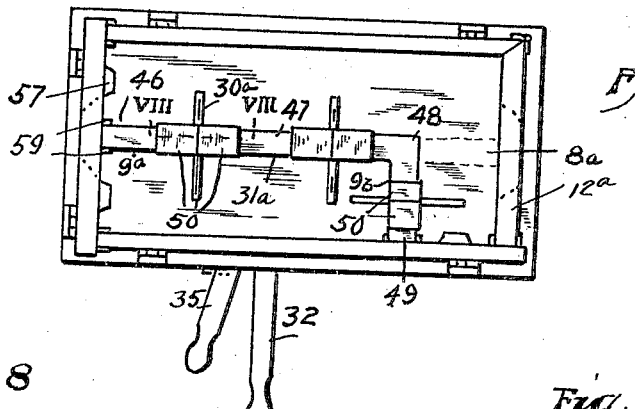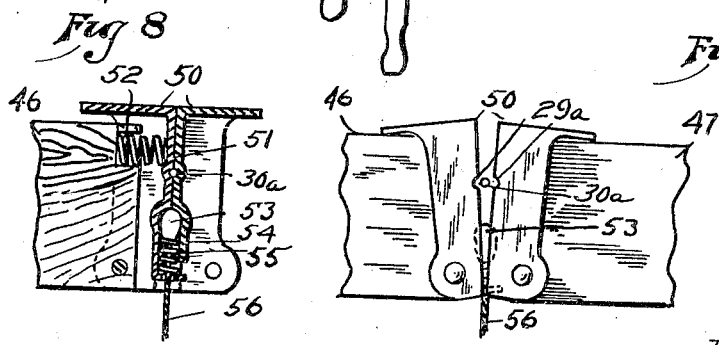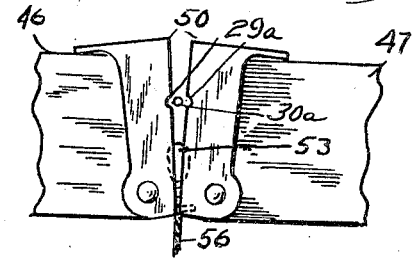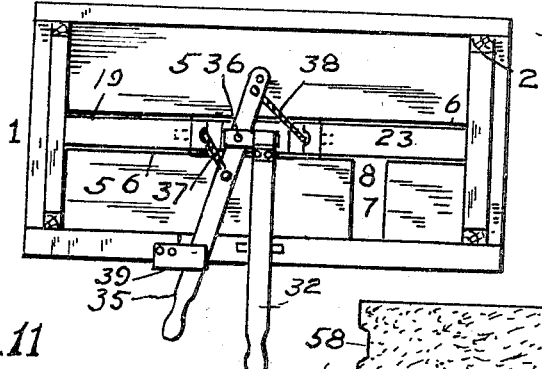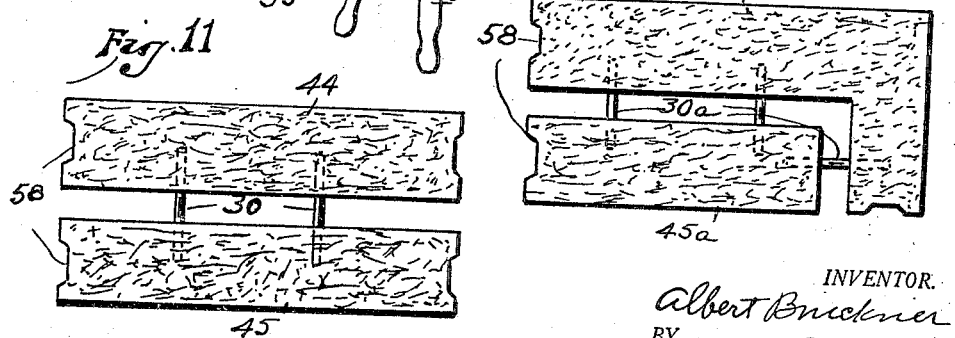

Patented Mar. 20, 1923.

1,448,911

UNITED STATES PATENT OFFICE.

ALBERT BRUCKNER, OF ETNA, PENNSYLVANIA.

APPARATUS FOR MAKING CEMENT BLOCKS.

Application filed May 4, 1922. Serial No. 558,353.

*To all whom it may concern:*

Be it known that I, ALBERT BRUCKNER, a citizen of the United States, residing at Etna, in the county of Allegheny and State of Pennsylvania, have invented new and useful Improvements in Apparatus for Making Cement Blocks, of which the following is a specification.

My invention relates to machines for making cement blocks.

The object of this invention is to provide a collapsible mold which supports tie-rods for connecting portions of the blocks together in a novel manner.

Figure 1:
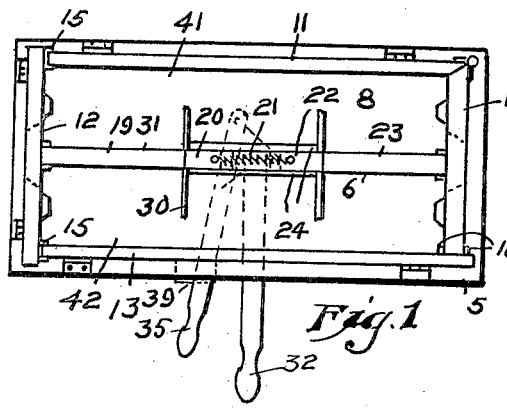
Figure 4:
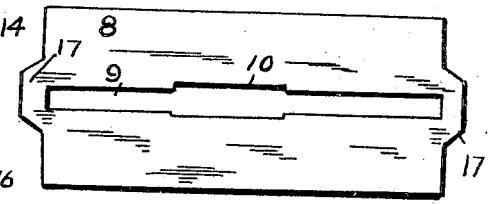
Figure 2:
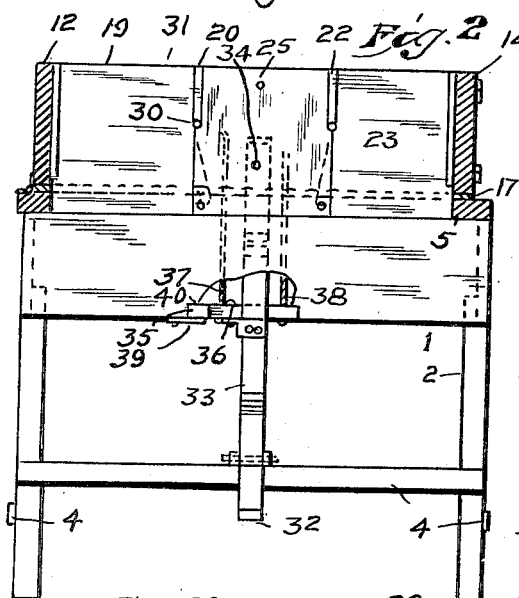
Figure 3:
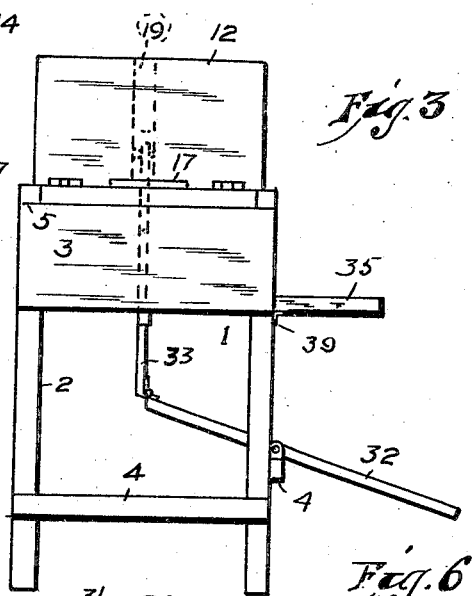
Figure 5:
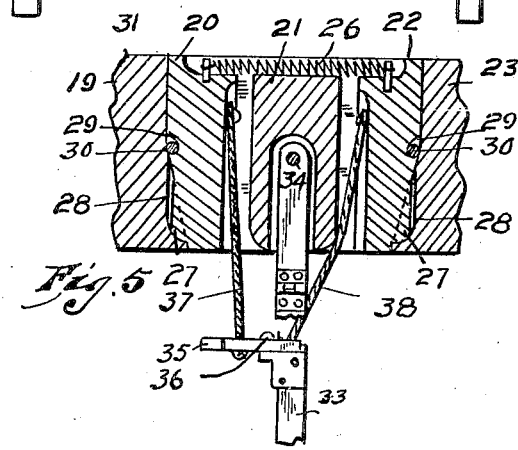
Figure 6:
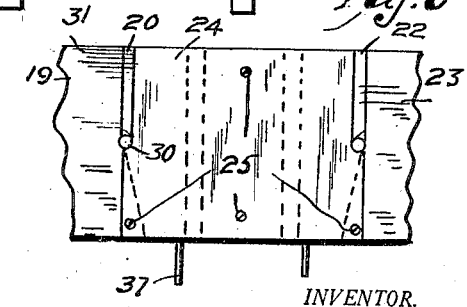

Referring to the accompanying drawings, Fig. 1 is a top plan view of a mold for making rectangular blocks; Fig. 2, a longitudinal section of the upper part of Fig. 1 and a side view of the lower part thereof, a portion being broken away; Fig. 3, an end elevation of Fig. 1; Fig. 4, a plan view of a bottom board or plate on which the blocks are cast; Fig. 5, a central longitudinal section of the middle portion of Fig. 1; Fig. 6, a side elevation of the portion of Fig. 1 represented by Fig. 6; Fig. 7, a top plan view of a mold for making a corner block; Fig. 8, a sectional detail along the line VIII—VIII of Fig. 7; Fig. 9, a side view of the portion of Fig. 7 represented by Fig. 8; Fig. 10, a bottom plan view of Fig. 1, parts being in section; Fig. 11, a plan view of a block cast in the mold shown in Fig. 1; and Fig. 12, a plan view of a block cast in the mold shown in Fig. 7.

Referring first to Figs. 1 to 6, 10 and 11, 1 designates the base or table of a moulding or casting apparatus, having the legs 2, the sides 3 enclosing the upper part of the table, and the tie-bars 4 connecting opposing legs 2 below the sides 3. 5 is the top of the table and has the central longitudinal slot 6, and the branch slot 7.

On the top 5 I arrange the mold-bottom or plate 8 having the slot 9 registering with the slot 6, the slot 9 being somewhat widened at its central portion as shown at 10, and the slot 6 being as wide as the said widened portion 10 of the slot 9.

Three mold-sides 11, 12, and 13 are hinged at their bottom edges to the top 5 near its edges, the remaining mold-side 14 being hinged to the mold-side 11. The mold-side 12 may have spaced lugs 15 to receive the adjacent ends of the sides 11 and 13, and the side 13 has the lugs 16 to receive the free end of the side 14. The bottom plate 8 has the end extensions 17 which project into recesses in the bottom edges of the mold-sides 12 and 14.

Arranged to slide up and down is the mold spacer or divider 31 comprising the five sections 19, 20, 21, 22, and 23 arranged end to end, the sections 19, 21 and 23 being connected together by the two metal plates 24 secured to the sections 19, 21 and 23 by the screws 25 or other suitable means. The sections 20 and 22 stand, respectively, between the sections 19 and 21, and the sections 21 and 23. The sections 20 and 22 normally touch the sections 19 and 23, respectively, and are yieldingly held against said sections by the expansive action of the coiled spring 26 having its ends connected to the sections 20 and 22. The lower portions of the sections 20 and 22 have tongues 27 in recesses 28 in the adjacent sections 19 and 23 to hold and guide the latter sections. The outer edges of the sections 20 and 22 have one or more notches 29 to support the horizontal metal tie-rods 30, which project well into the mold spaces on each side of the spacer or divider 31.

32 is a lever pivoted to one of the bars 4 and has one end pivoted to the bar 33 connected to the section 21 by the pin 34.

35 is a lever resting on the bracket 39 and is pivoted at 36 so as to have horizontal movement. A rope 37 connects the upper end of the inner edge of the section 20 to the lever 35 at one side of the pivot 36, and the rope 38 connects the upper end of the inner edge of the section 22 to the lever 35 at the other side of the said pivot. The outer end of the lever normally rests on the bracket 39 secured to the lower edge of the front side 3, the lever working in a slot 40 in the said side.

The parts being as shown, cement or concrete is poured into the mold spaces 41 and 42 on opposite sides of the divider 31. After the poured material has become hard, the mold-sides are swung away from the molded block; the lever 35 is moved to the right, which causes the ropes 37 and 38 to swing the sections 20 and 22 toward the section 21 so that the notches 29 are out of line with the tie-rods 30; and then the lever 32 is lifted, thereby causing the divider 31 to travel down free from the molded block which comprises the members 44 and 45 tied together by the rods 30, as shown in Fig. 11.

The bottom plate 8 with the block thereon may then be removed. A fresh plate 8 is then placed on the top 5; the mold-sides are closed; the divider 31 is raised to its normal position by the lever 32; tie-rods 30 are placed in the notches 29; and the lever 35 is moved to the left, allowing the spring 26 to move the sections 20 and 22 outwardly. The lever 35 rests on the bracket 39 and thereby holds the divider 31 in its elevated position.

When it is desired to make a corner block like that shown in Fig. 12, the plate 8 is replaced by the bottom-plate 8ª (Fig. 7) having the longitudinal slot 9ª and the branch slot 9ᵇ, the slot 9ª terminating at the slot 9ᵇ. The plate 8ª covers that portion of the slot 6 which extends beyond the slot 7, and registers with the slot 6 from the mold-side 12ª to the slot 7, the latter registering with the slot 9ᵇ.

The divider 31ª is L-shaped and has the sections 46, 47, 48 and 49, the sections being placed end opposite end, but with a pair of tie-rod holders 50 between adjacent ends, and the section 48 being L-shaped with one of its legs in the slots 6 and 9ª and the other in the slots 7 and 9ᵇ. The holders 50 are made of metal and are hollow so as to surround the opposing ends of the sections 46—49 on all sides except the bottom side. The opposing faces of each pair form a tight joint 51 when in their normal positions, as in Figs. 7 and 8. These faces have the notches 29ª to support the tie-rods 30ª when the holders 50 are closed, but these notches do not overlie the tie-rods when the holders are open as in Fig. 9. The members of each pair of holders 50 are yieldingly held closed by springs 52, and are forced apart by the wedge 53 operating in a socket 54 formed in the opposing members. The wedge is held upwardly by the spring 55 and pulled downwardly by the rope 56. By operating the lever 35, the ropes 56 are all drawn down, as are the ropes 37 and 38 in Fig. 5, whereby notches 29ª will pass by the tie-rods 30ª when the lever 32 is operated as in Fig. 1 to move the divider downwardly, the wedges 53 serving as connectors for the sections. The mold-sides having been swung down the corner block like that shown in Fig. 12 may be removed on the plate 8ª. Another plate 8ª is placed on the top 5. The lever 32 is operated to move the divider 31ª to its normal position, the lever 35 preferably being moved to the left so that the springs 52 may close the members 50 and thus allow the wedges 53 the better to serve as connectors between the successive divider-sections. The members 50 are then opened by the lever 35 or by hand and fresh tie-rods are placed in the notches 29ª. The sides of the mold are then closed and the mold is ready for another casting operation.

The mold-sides may have the projections 57 for forming recesses 58 in the ends of the blocks.

The ends of the dividers may be guided by pairs of lugs 59.

I claim—

1. In an apparatus for forming cement blocks composed of spaced members connected by tie-rods, a slotted mold-bottom, collapsible mold-sides, a divider dividing the space enclosed by the mold-sides into plural casting spaces and having vertical travel through the slot whereby it may retire from the said space, and horizontally movable means carried by the divider and having lateral notches for supporting the said tie-rods with their opposite ends in the said casting spaces, the said means having movement in one direction to hold the tie-rods in the notches and in the opposite direction to be released therefrom.

2. In an apparatus for forming cement blocks composed of spaced members connected by tie-rods, a slotted mold-bottom, collapsible mold-sides, and a divider dividing the space enclosed by the mold-sides into plural casting spaces and having vertical travel through the slot whereby it may retire from the said space, the divider having pivoted members with notches to receive and support the tie-rods and movable laterally to release the members from the tie rods.

3. In an apparatus for forming cement blocks composed of spaced members connected by tie-rods, a slotted mold-bottom, collapsible mold-sides, and a divider dividing the space enclosed by the mold-sides into plural casting spaces and having vertical travel through the slot whereby it may retire from the said space, pivotal devices carried by the divider and having notches which surround and support the tie-rods and means for moving the devices to release them from the tie rods.

4. In an apparatus for forming cement blocks composed of spaced members connected by tie-rods, a slotted mold-bottom, collapsible mold-sides, a divider dividing the space enclosed by the mold-sides into plural casting spaces and having vertical travel through the slot whereby it may retire from the said space, the divider having movable members with notches which surround and support the tie-rods, and means for moving the members horizontally away from the tie-rods whereby the divider may be lowered free from engagement with the tie-rods.

Signed at Pittsburgh, Pennsylvania, this 1st day of May, 1922.

ALBERT BRUCKNER.